United States Patent [19]
Cragun

[11] Patent Number: 5,161,665
[45] Date of Patent: Nov. 10, 1992

[54] LANE MERGER APPARATUS

[75] Inventor: John E. Cragun, Deerwood, Minn.

[73] Assignee: Riverwood International Corporation, Denver, Colo.

[21] Appl. No.: 612,067

[22] Filed: Nov. 13, 1990

[51] Int. Cl.⁵ .............................................. B65G 47/12
[52] U.S. Cl. .................... 198/448; 198/419.3; 198/444; 198/452
[58] Field of Search ............ 198/419.3, 444, 447, 198/448, 449, 452

[56] References Cited

U.S. PATENT DOCUMENTS

| | | | |
|---|---|---|---|
| 1,196,442 | 8/1916 | Eick | 198/452 |
| 2,678,124 | 5/1954 | Bergmann | 198/444 |
| 2,943,722 | 7/1960 | Fauth | 198/448 |
| 3,028,946 | 4/1962 | Krupp et al. | 198/448 |
| 3,053,025 | 9/1962 | Nigrelli et al. | 198/419.3 X |
| 3,071,236 | 1/1963 | Hahn et al. | 198/419.3 X |
| 3,224,550 | 12/1965 | Nigrelli et al. | 198/444 |
| 3,244,267 | 4/1966 | Berta | 198/448 |
| 3,366,220 | 1/1968 | Hebel | 198/448 |
| 4,019,620 | 4/1977 | Frenkel et al. | 198/447 X |
| 4,265,356 | 5/1981 | Glover | 198/444 |

FOREIGN PATENT DOCUMENTS 0383615  8/1990  European Pat. Off. ............ 198/444

*Primary Examiner*—Joseph E. Valenza
*Assistant Examiner*—Tuan N. Nguyen
*Attorney, Agent, or Firm*—Joel D. Skinner; Anthony G. Eggink

[57] ABSTRACT

An apparatus and method for merging articles on multiple infeed lines into a single outfeed line. The apparatus comprises a frame structure with an infeed end and an outfeed end, and at least two side transfer conveyors, each with a pair of parallel upstanding belts separated a predetermined distance and forming a central conveyance path. The side transfer conveyors are alternately operable to convey a predetermined number of articles to the outfeed end. A guide rail structure is located at the outfeed end and is aligned with the side transfer conveyors to direct output articles into a single line configuration.

14 Claims, 7 Drawing Sheets

LANE MERGER APPARATUS

BACKGROUND OF THE INVENTION

This invention relates to a product conveyance system and method, and more particularly to an apparatus and method for merging a number of infeed product streams into one or a lesser number of product outfeed streams. The apparatus is particularly useful for merging products or containers into a single outfeed lane or line for subsequent processing or packaging purposes. The apparatus may further be used to separate and position a non-uniform product supply from product infeed sources to provide a metered or collated outfeed.

Because of advances in the manufacture and filling of product containers, and the increased speed of these processes, it has become necessary to provide a reliable, continuous lane merging device, and particularly one which is useable with pliable containers. In the past, various devices have been used and proposed to merge and collate a stream of products for subsequent packaging purposes. Many such devices utilize star-wheel structures, screw structures, or flight bar structures to engage products. However, these devices are generally complex, difficult to manufacture, and are inefficient. Also, prior art devices have been found unsuited for use with pliable or otherwise unstable product units. Due to the flexible and pliable nature of many products, such as plastic containers, and due to the pressures exerted on a given container by adjacent upstream containers, such products have a tendency to deform and to resist reliable merging and metering by prior art devices. Prior art structures can cause product damage, such as spearing or jamming, as well as irregular metering with respect to such products.

Despite the need for an efficient device in the art which provides a means to merge a number of product streams into one constant product outfeed stream, and which overcomes the limitations and problems of the prior art, none insofar as is known has been proposed or developed.

Accordingly, it is an object of the present invention to provide a lane merger apparatus and method which provide a constant supply of individual articles, such as bottles, to an outfeed stream from a plurality of infeed sources. A further object is to provide an apparatus and method which is useable in a continuous, high volume packaging operation, particularly one which utilizes pliable containers. The lane merger apparatus of this invention, overcomes the shortcomings and limitations of the prior art devices. Particularly, the apparatus permits products or containers to be merged from a plurality of infeed lines onto a single outfeed line in a continuous operation, and without interference or interruption. The apparatus also merges a number of product infeed conveyors which may or may not be operational at any given time. Thus, the apparatus ensures constant product availability to the outfeed conveyor. The apparatus further permits products to be metered or collated into particular product groups on the outfeed line. Finally, this invention provides an apparatus which is effective at merging and collating flexible and unstable products.

SUMMARY OF THE INVENTION

The present invention provides a lane merger apparatus for merging articles on a plurality of separate infeed lines into a single metered outfeed line. The apparatus comprises a frame structure which has a substantially planar, stationary top work platform, and further includes an infeed end and an outfeed end. A plurality of infeed conveyors transport a supply of articles to the frame structure infeed end at a first predetermined rate. A plurality of corresponding side transfer conveyors are disposed on the frame structure and are aligned with respective infeed conveyors at the frame structure infeed end. Each side transfer conveyor has a pair of parallel upstanding belts separated a predetermined distance, and which form a linear, central conveyance path. The side transfer conveyors are alternately operable to engage and convey a predetermined number of articles from the respective infeed conveyors, to the frame structure outfeed end at a second predetermined rate. A control system provides alternating and synchronized operation of the side transfer conveyors, and preferably includes sensors disposed at the frame structure outfeed end, adjacent the side transfer conveyors. A guide rail structure is located at the frame structure outfeed end and is aligned with the side transfer conveyors to direct articles conveyed thereby into a single line configuration. An outfeed conveyor is aligned with the guide rail structure to receive articles therefrom and to transport the articles at the second predetermined rate.

This invention further provides method of merging articles from a plurality of infeed lines into a single outfeed line. The process comprises a first step of providing a continuous supply of articles at a plurality of input locations via separate conveyance means. A second step involves engaging a predetermined number of articles from a first input location and linearly conveying the articles at a predetermined speed to an output location. A third step includes conveying the articles from the output location via a single conveyance means. A fourth step involves engaging a predetermined number of articles from a second input location and linearly conveying the articles at a predetermined speed to the output location. A fifth step includes conveying the output articles from the second input location via the conveyance means. The process is continuous by repetition of steps 2 through 5, as described above with respect to each infeed location, and in a cyclical manner. These and other benefits of this invention will become clear from the following description by reference to the drawings.

DESCRIPTION OF THE PREFERRED EMBODIMENT

Figure 1:
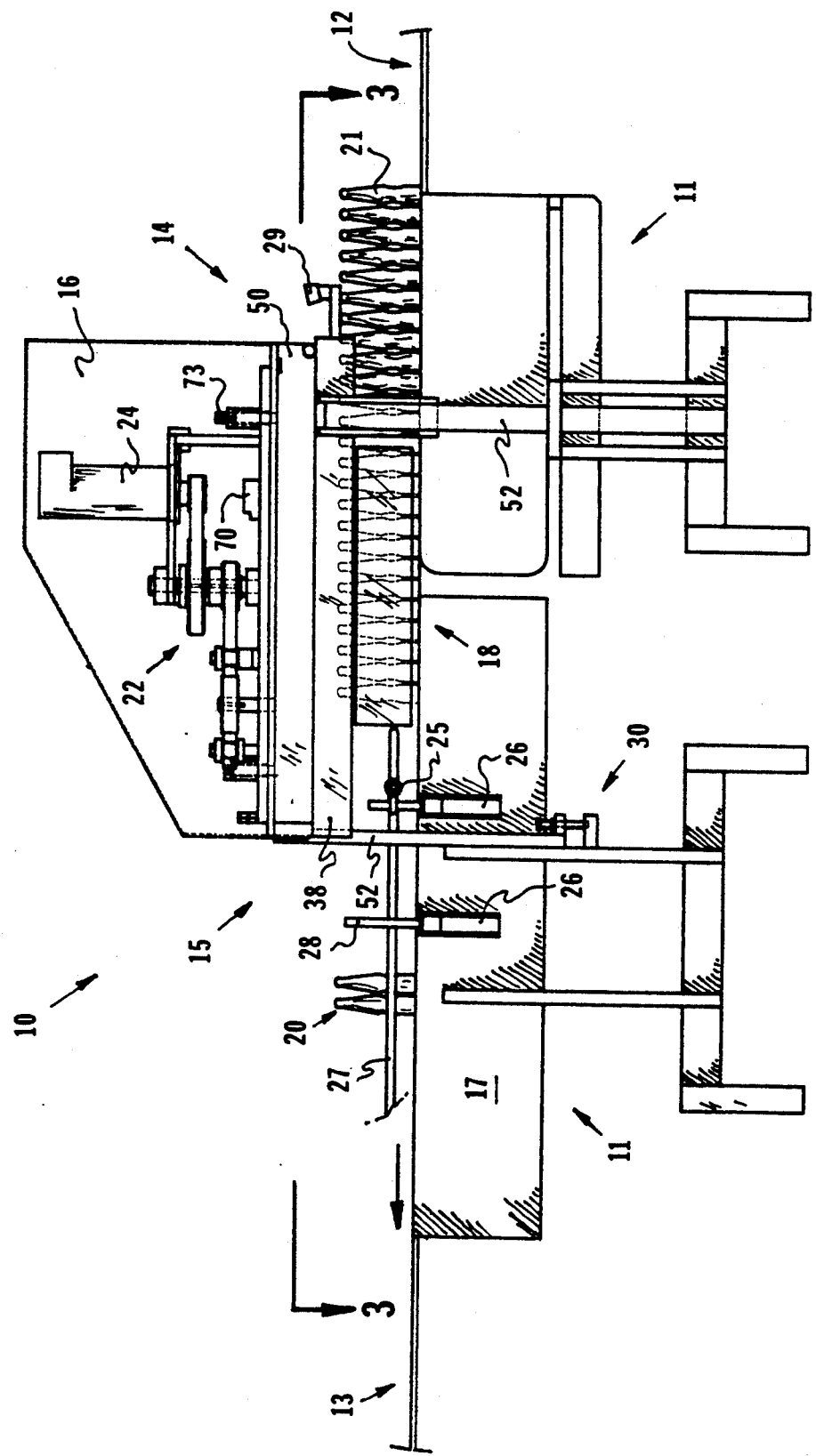
FIG. 1 is a side plan view of the lane merger apparatus of this invention.
Figure 2:
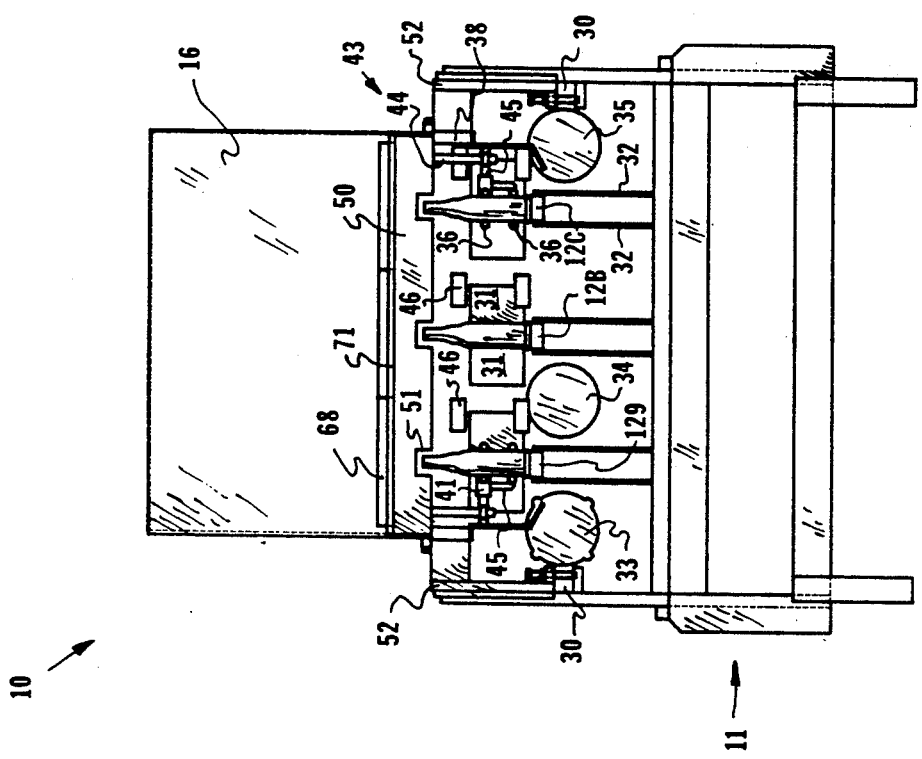
FIG. 2 is an end plan view, showing the infeed end of the lane merger apparatus of FIG. 1.
Figure 3:
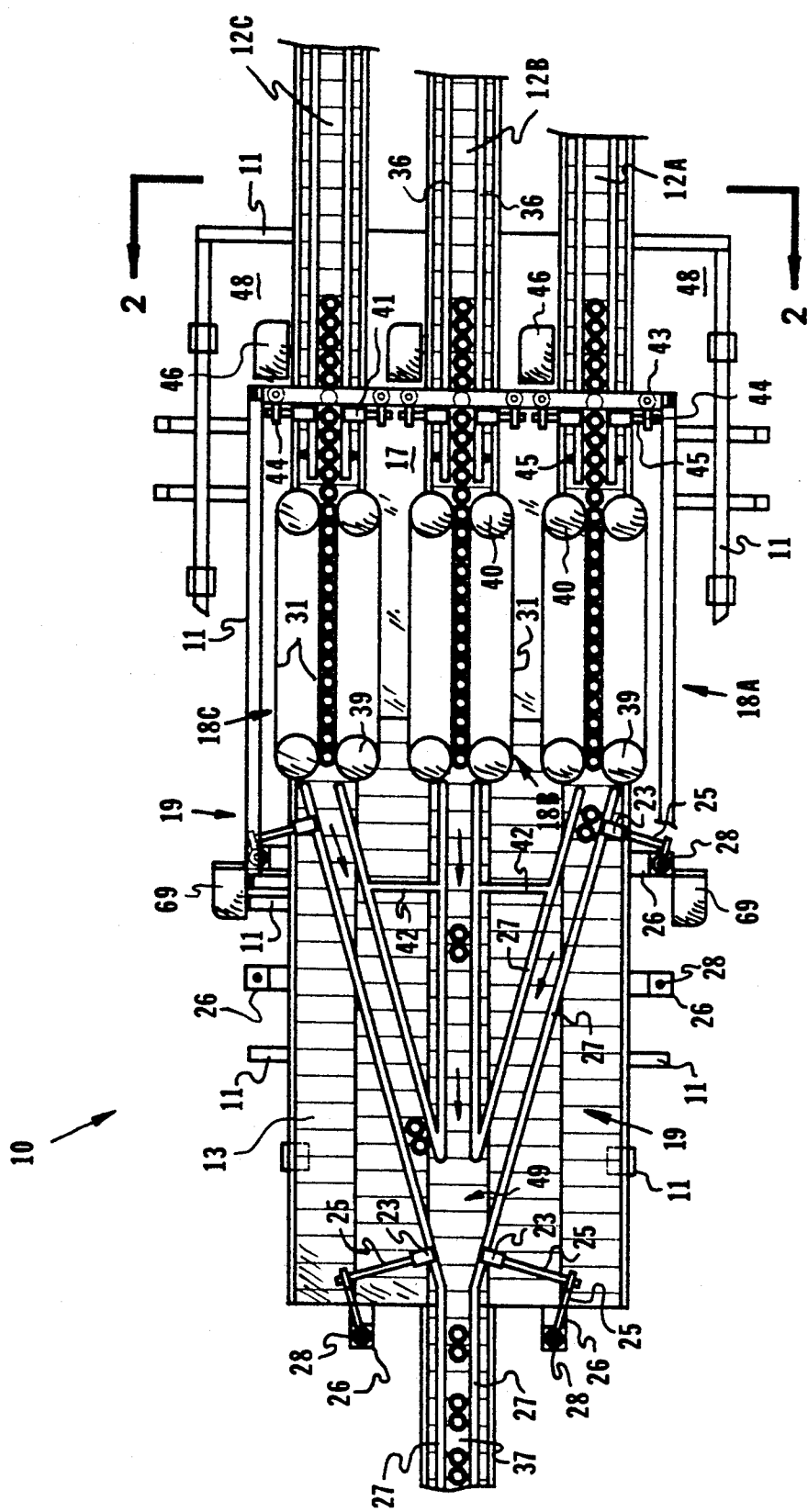
FIG. 3 is a top plan view of the lane merger apparatus, taken along line 3—3 of FIG. 1.

Referring to FIGS. 1-3, the lane merger apparatus 10 is shown to generally comprise a frame structure 11, a plurality of infeed conveyor lines 12, a plurality of side transfer conveyors 18, and an outfeed conveyor line 13. The infeed conveyor lines 12 each transport a stream of articles, such as containers 21, at a predetermined speed from related product packaging apparatus, for example. The side transfer conveyors 18 are synchronized to alternately output a predetermined number of articles from the respective infeed lines 12, preferably at a higher speed. The articles 21 moved by the side transfer conveyors 18 are deposited on the outfeed conveyor 13, which preferably operates at the same speed as the side transfer conveyors 18. An outfeed guide structure 19 is arranged to direct the containers 21 output from the side transfer conveyors 18 onto the single lane portion 37 of the outfeed conveyor 13. The synchronized, alternating operation of the side transfer conveyors 18 merges the infeed lines 12 into a single outfeed line 37, and which at the same time can meter the product outfeed into predetermined product groups 20.

Embodiments of the lane merger apparatus of this invention are shown and described for use with both two, and particularly, three input lines and a single outfeed line 37. However, further embodiments may be constructed, consistent with the teachings of this invention, which are operative on a greater number of infeed lines, or even a greater number of outfeed lines. The important factor is the provision of side transfer conveyance mechanisms 18, in cooperation with article infeed structures, and article output conveyance and guidance structures, as more fully described herein. Additionally, an embodiment for use with a single input and output line, and with a single side transfer mechanism can be constructed for the purpose of metering and collating a continuous, or otherwise unstructured stream of products into a metered, collated or separated outfeed of predetermined product groups or units.

The frame structure 11 has an inlet end 14 and an outlet end 15. The frame structure 11 is shown to be generally comprised of a plurality of leg members, several vertical supports which extend upwardly from the legs, horizontal side wall members which are connected to the vertical supports, and a flat platform or table top 17 which is supported by the side walls. Additional vertical supports 52 extend upwardly from the side walls to support a drive framework 38 and 50. The drive framework 38 and 50 is elevated a predetermined distance above the level of the platform 17. A plurality of height adjustment members 30 are disposed on the frame structure 11 to vary the level of the drive framework 38 and 50 above the platform 17. A drive assembly mounting plate 68 is disposed on top of and supported by the drive framework 38 and 50. The drive framework 38 and 50 further is shown to support a safety shield assembly 16 which encloses an apparatus drive assembly. Shield supports 29 may be provided to secure panels of the safety shield 16 when opened for access to the drive mechanism 22.

Figure 4:
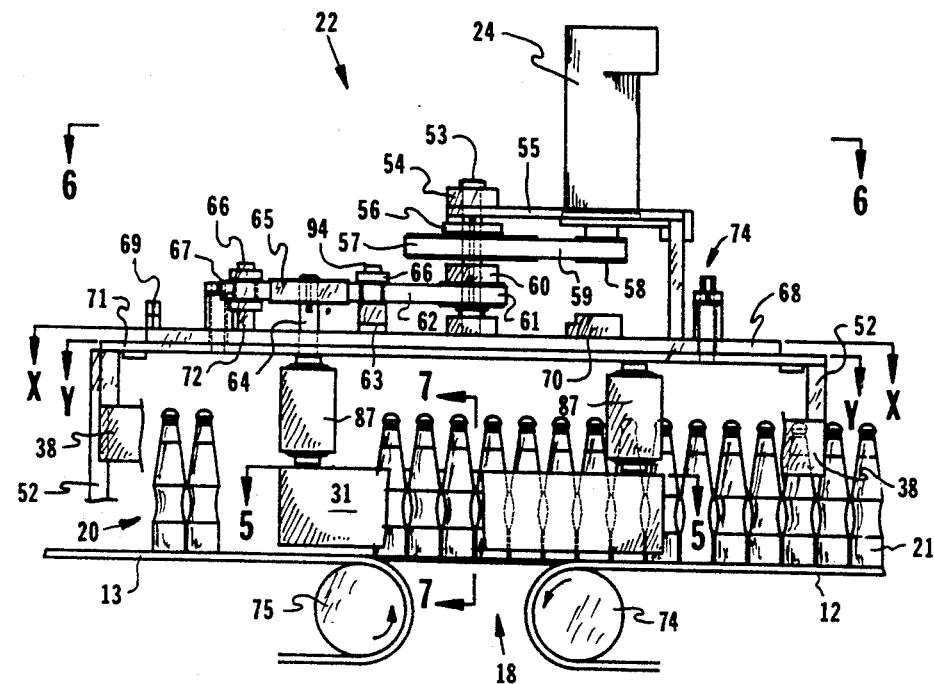
FIG. 4 is a detailed view of the apparatus as shown in FIG. 1.

As shown, three infeed conveyors 12(a-c) are disposed at the infeed end 14 in a spacially parallel, side-by-side arrangement. Referring also to FIG. 4, the infeed conveyors 12 each have a sprocket 74 which is mounted to the frame structure 11 side wall above the level of the platform 17. Conveyor belts, as known in the art, are arranged to rotate around the sprocket 74, and each sprocket 74 is driven by a separate drive motor 33, 34 and 35. Alternatively, the infeed conveyors 36 may be powered by a unitary drive mechanism. The conveyor belts are shown to be supported by an infeed conveyor frame 32.

Each infeed conveyor 12 has an independent guide rail structure 36 for maintaining containers 21 in an upright and aligned position, and which is shown to consist of a set of top and bottom side rails located immediately adjacent each side of the conveyor belt. A railing support structure 43 adjustably supports each railing and is shown to have a vertical support 44, a horizontal support 45 adjustably coupled to the vertical support 44 and connected to the upper guide rail 36 and to the lower guide rail 36 via clamps 41. Cutouts 51 in the upper drive frame member 50 permit ingress of the containers 21 shown in FIG. 2.

As best shown in FIG. 3, the outfeed conveyor 13 is preferably a unitary system disposed at the outfeed end 15 of the frame structure 11, and which consists of a wide portion arranged to receive products from a plurality of locations, for example three (3), and to convey the articles 21 or groups of articles 20 to an end location terminating in a narrow portion 37 arranged to transport the article in a single line configuration. Referring also to FIG. 4, the infeed conveyor 12 has a sprocket 75 which is also mounted to the frame structure 11 side wall above the level of the platform 17. A linked conveyor belt rotates around the sprocket 75, which is driven by a down stream drive motor or other power source (not shown). An outfeed conveyance system may alternatively be constructed of a plurality of independent conveyors which extend from each side transfer conveyor 18 and converge into a single lane, for example on a separate conveyor. The floor level or base surface for supporting the lane merger apparatus 10 is designated by reference numeral 48 in FIG. 3.

The outfeed conveyor 13 has a guide rail structure 19 for directing the articles conveyed thereby into single line configuration. The guide rail structure shown has three (3) separate conveyance paths which intersect at a merge area 49 anterior to the single lane portion 37. Alternatively, the guide rail structure can be arranged so as to have a single path by having only the outermost guide rails 27. In this configuration, the product groups 20 output by side transfer conveyors 18(a and c) are directed to the single lane conveyor portion 37 by contact with the guide rails 27, while product groups 20 output by side transfer conveyor 18b are transported directly toward the single lane conveyor portion 37. The output guide rail structure 19 preferably consists of top and bottom side rails 27 which are connected to a horizontal support 25 by a clamp 23. The horizontal support 25 is then connected to a vertical support 28, which is mounted on a bracket 26 connected to the frame structure 11 side wall. Horizontal cross supports 42 are shown to support the interior side rails 27.

The side transfer conveyors 18 are each comprised of vertically oriented, endless belts 31 of a predetermined length, arranged in a side-by-side or double-sided configuration so as to form a central conveyance path approximately the width or diameter of a single article. The transfer length and speed of the side transfer conveyors 18 are dependent upon article configuration, the number of conveyors 18 provided and upon input and output requirements. The width or height of the belts 31 is variable depending upon the dimensions of the articles to be merged. The side transfer conveyors 18 are adjustable to permit variation of the engagement force so as to be operative on a variety of container or other article structures, compositions and sizes, and with various product contents. The belts 31 are rotated by pulleys 39 and 40 so that articles 21 are gripped and linearly moved down the conveyance paths in close registration with one another. As shown, the belts 31 rotate around the drive and idler pulleys 39 and 40 so that opposing portions of each belt 31 travel in the same direction. The belts 31 are constructed of a flexible product gripping type of material, preferably a flat surface constructed of a food grade material such as a plastic with a nylon core, molded rubber, or polyurethane. Additionally, non-flat belts such as those utilizing a linked, segmented structure, as known in the art, are useable consistent with the invention. FIG. 4 shows a void area directly below the side transfer conveyors 18, and between the infeed and outfeed conveyors 12 and 13. Articles 21 are transported across the void area and above the top surface of the platform 17 by the gripping action of the side transfer conveyor belts 31. The dimensions of the void area are dependent upon the transfer length of the side transfer conveyors 18, and the particular dimensions and structure of the infeed and outfeed conveyors 12 and 13. Alternatively, the void area may be substituted with a dead plate surface, so long as low friction is provided and maintained.

Figure 5:
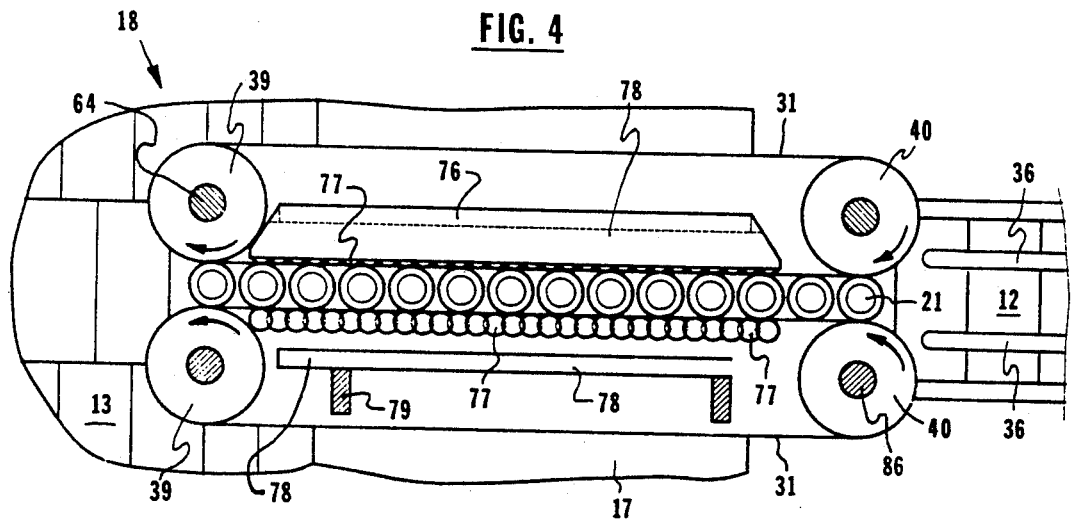
FIG. 5 is a top cross-sectional view of the apparatus, taken along line 5—5 of FIG. 4.
Figure 7:
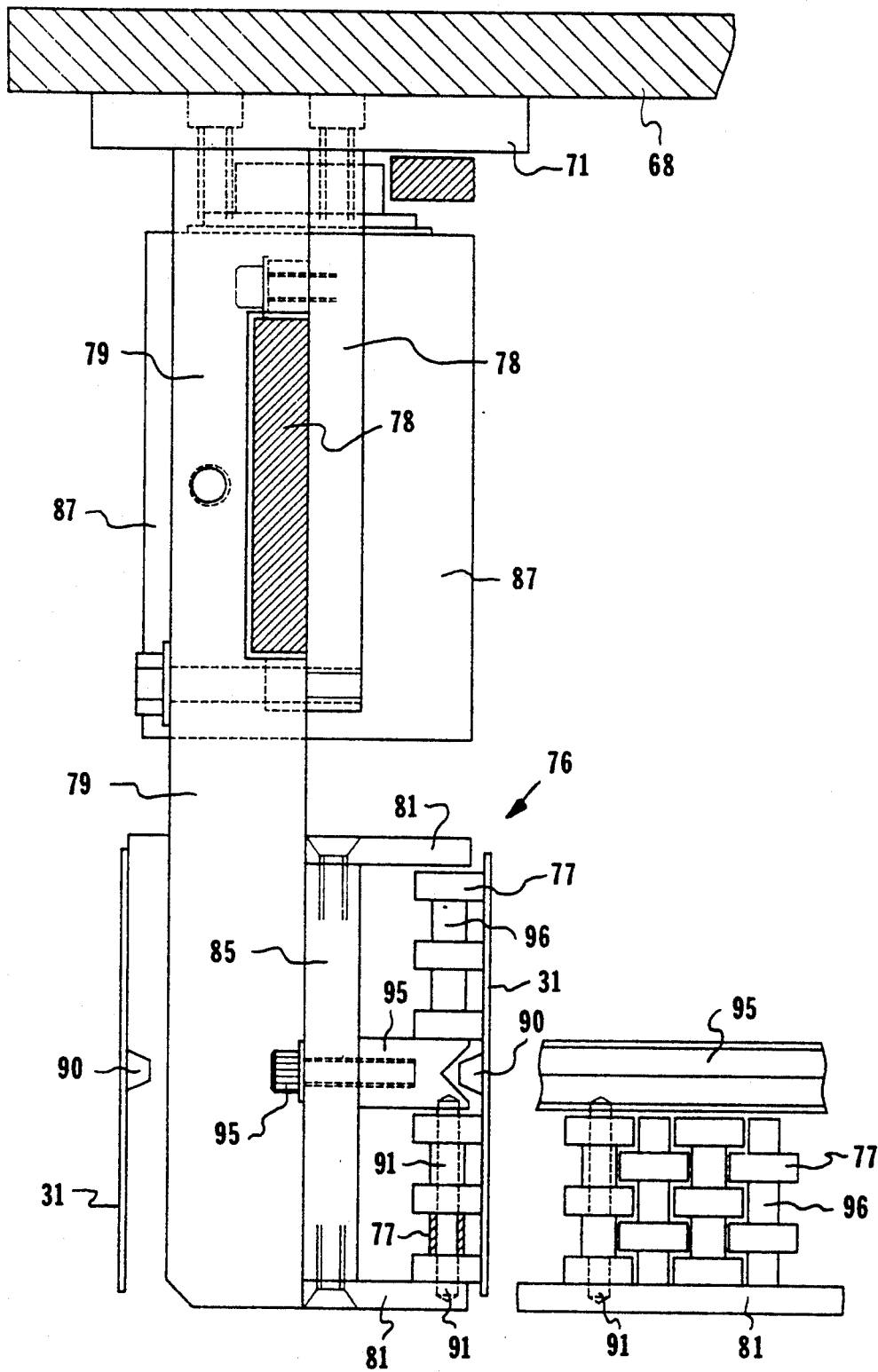
FIG. 7 is a cross-sectional view of the apparatus, taken along line 7—7 of FIG. 5, and further including a portion of the side transfer mechanism from a side plan view.

Referring to FIGS. 5 and 7, each side transfer conveyor 18 further has a support or backing structure 76 which enables the rotating belts 31 to engage and maintain engagement of the articles 21 in the central conveyance path. The support structure 76 is disposed directly behind the portion of the belts 31 which are adjacent the central conveyance path. The support structure 76 comprises a vertical brace 85 which is coupled to a vertical bracket 79 via a bolt 97. Top and bottom horizontal roller supports 81 are connected to the brace 85 via screws. Center guides 95 are connected at the midsection of the brace 85, also via the bolt 97, and extend therefrom in opposing directions. A plurality of spacially parallel roller shafts 91 are vertically disposed between each roller support 81 and the center guide 95. As shown, rollers 77 are axially and rotatably linked to the roller shafts 91 and are separated by spacers 96, which are also axially disposed about the roller shaft 91. Preferably, the rollers 77 and spacers 96 are arranged on each shaft 91 so that they are staggered with respect to adjacent shafts 91, thereby providing a substantially flat outward surface with uniformly and densely positioned rollers 77. The rollers 77 provide backing support to the flexible belts 31 so that gripping contact between the belts 31 and articles within the conveyance path is uniformly and firmly maintained. Additionally, due to the rotation of the rollers 77 about the shafts 91, friction between the moving belts 31 and the backing support is reduced. The center guide 95 is further shown to have a generally V-shaped notch at its outwardly extended end. The belts 31 preferably have a backing rib 90 which is aligned with the center guide 95 and which cooperate to maintain alignment of the belt 31 during the transfer process.

The side transfer conveyors 18 are synchronized with respect to time and/or article output positioning, via a microprocessor-based control system located in a module 70. The control system regulates the activation of a plurality of motors 24; each motor 24 driving an individual side transfer conveyor 18(a–c) via a belt or drive assembly 22. The motor drives 24 are preferably Stepper motors, as known in the art. Additionally, AC or DC drive motors with a clutch brake, Servo motors, and AC synchronous motors, which are able to be switched on and off quickly, are useable for powering the side transfer mechanisms 18. Such systems provide the capacity to quickly initiate and terminate transfer and output of articles at each individual side transfer conveyor for merging purposes, and particularly, when metering and collating is desired.

Figure 6:
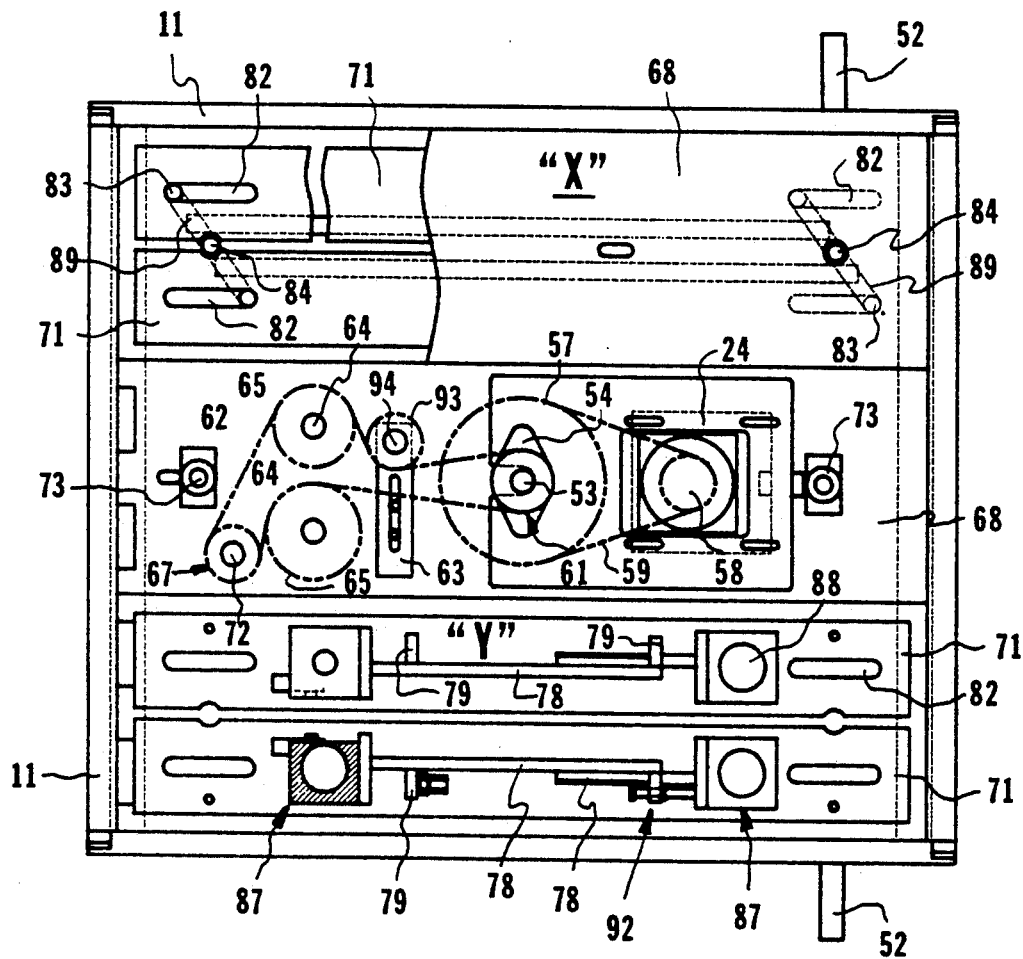
FIG. 6 is a top plan view of the apparatus, taken along lines 6—6, X—X and Y—Y of FIG. 4.

FIGS. 4 and 6 show a single motor 24 and drive system 22 for clarity, although three such motor/drive combinations are utilized to independently drive the side transfer conveyors 18(a–c) of the three lane merger embodiment shown. The motor 24 is shown to be mounted on top of a motor support plate 68 with its drive shaft oriented vertically. A motor drive pulley 58 is connected to the bottom end of the drive shaft. A first or top drive belt 59 is shown to couple the motor drive pulley 58 to a top drive pulley 57. The top drive pulley 57 is axially mounted to a first drive shaft 53 via a clamp collar 56. The first drive shaft 53 is coupled to the motor support plate 55 and to the merge belt mounting plate 68 via bearings 54. A bottom drive pulley 61 is also axially mounted to the first drive shaft 53, spacially below the top drive pulley 57, via a clamp collar 60. A second drive belt 62 is shown to couple the bottom drive pulley 61 to a pair of belt drive pulleys 65. The belt drive pulleys 65 are axially mounted to drive shafts 64. Also communicatively coupled to the second drive belt 62 are an idler pulley 93, and a back wrap idler pulley 67. The idler pulley 93 is axially mounted on an idler shaft 94 via a support bearing 66. The idler shaft 94 is rotatably mounted to an idler adjustment bracket 63 having an elongated slot, and which is adjustably fixed to the merge belt mounting plate 68. The back wrap idler pulley 67 is axially mounted to an idler shaft 72 via a support bearing 66, which is mounted to the merge belt mounting plate 68. Each drive system 22 translates force from a drive motor 24 to its respective pair of parallel and aligned drive shafts 64.

Figure 8:
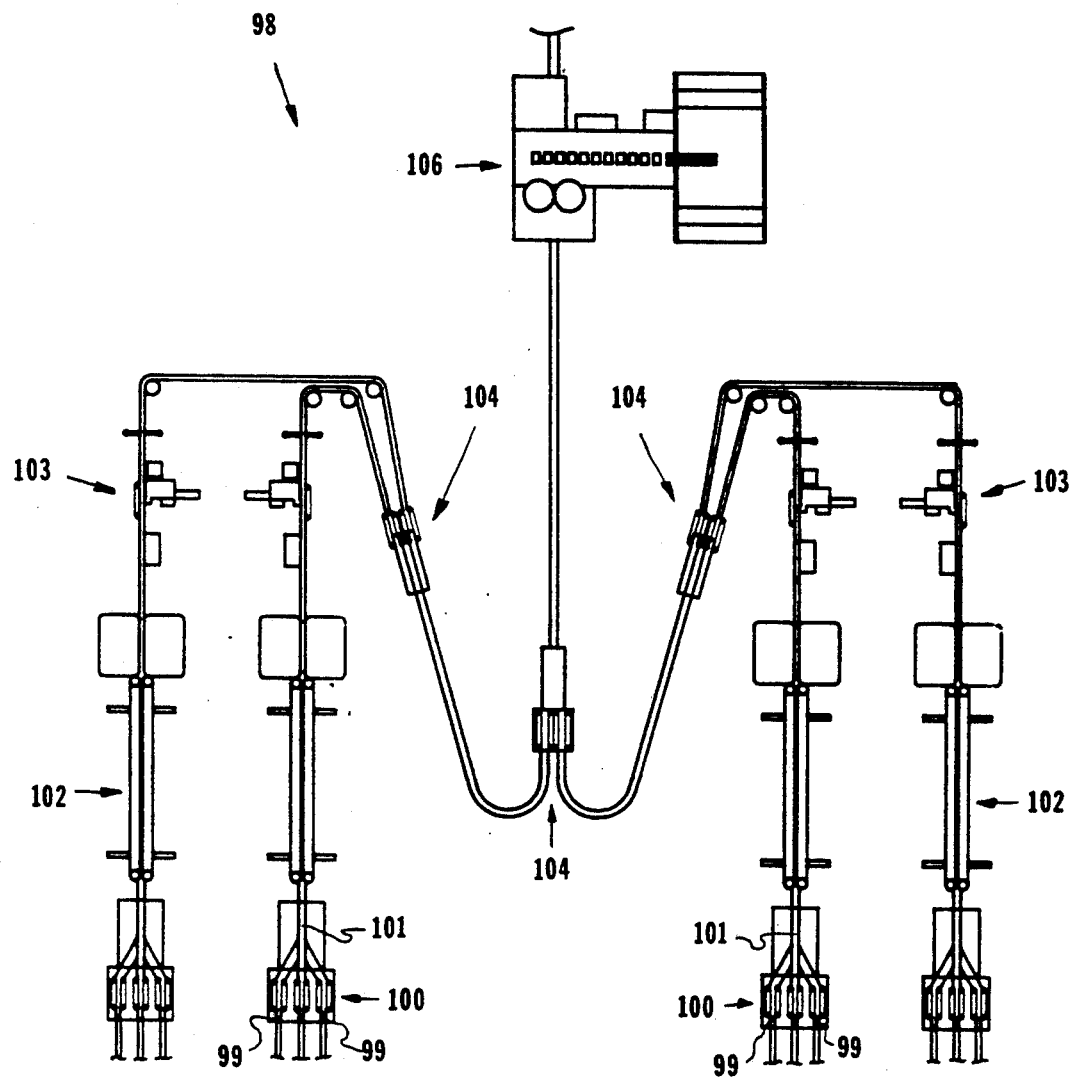
FIG. 8 is a top plan view of an overall product packaging operation incorporating and utilizing the lane merger apparatus of this invention.

Referring also to FIG. 7, the drive shafts 64 extend downwardly through the merge belt mounting plate 68 and the side adjustment mounting plates 71 to bearing blocks 87. The bearing blocks 87 have cavities 88 in which bearings (not shown) are held. The drive shafts 64 further extend through the bearing blocks 87 and are coupled to the belt drive pulleys 39. As shown in FIGS. 4 and 8, idler drive shafts 86 are disposed in opposing bearing blocks 87, and are connected to the idler belt pulleys 40.

The bearing blocks 87 are mounted to cross support brackets 78, which are supported by vertical support brackets 79. The cross support brackets 78 are longitudinally adjustable with respect to one another via a belt tension adjustment bolt 92 which is further connected to the vertical support 79. The above structure permits adjustable movement of the two drive belt pulleys 39 either away from or forward their respective idler belt pulleys 40 to vary belt 31 tension.

The side adjustment mounting plate 71 is shown to have a pair of elongated cam tracks 82 generally centrally disposed at opposing ends. A side adjustment connector 88 having a cam follower 83 connected to each end thereof, and a central pivot aperture 84 links each end of a pair of side adjustment mounting plates 71 via the cam tracks 82. The distance between the parallel, side-by-side pair of side adjustment mounting plates 71 is adjustable by manipulating adjustment bolts 73 connected at the pivot aperture 84 to permit relative movement to the above structure. And, since the vertical supports 79 are fixed at each end to the side adjustment plates 71, side or lateral position of the belts 31 and the conveyance path is adjustable.

Outfeed sensors 69, for example photoeyes, are disposed at the outlet end of each side transfer conveyor 18 and are further communicatively connected to the control module 70. The sensors 69 may be disposed adjacent the outfeed guide structure 19 as shown in FIG. 3, or alternatively they may be disposed above the outlet end of the side transfer conveyors 18 as shown in FIG. 4. The control module 70 is then linked to each individual drive motor 24. The outlet sensors 69 monitor the position of articles 21 engaged by the side transfer conveyors 18 at each output end to insure proper metering. For example, for metering purposes as well as lane merging, the sensors 69 detect the output of each individual member of a predetermined group. Upon detection of the output of the last predetermined member, for example, the sixth unit of a 6-pack group, the side transfer mechanism 18 is deactivated. Alternatively, for lane merging purposes alone, the sensors 69 may be deactivated, and the control system is utilized to synchronize activation of the side transfer conveyors 18 with respect to time. Each side transfer mechanism may be programmed to run for a set interval of time, whereby a predetermined group size, plus or minus one member is output. For example, an activation interval of approximately 1-2 seconds would output approximately 5 to 10 container units depending upon their dimensions.

The device also has upstream surge control sensors, such as photoeyes 46, disposed adjacent the infeed lines 12 to provide information to the control system as to the supply of input articles on the respective infeed lines 12(a-c). Thus, only input lines 12 having a supply of articles present will activate their respective side transfer conveyor 18(a-c), while the other infeed line or lines is temporarily void of product. Each sensor 46 is communicatively linked to a respective infeed conveyor 12 drive motor 33, 34 and 35.

The infeed and outfeed sensors 46 and 69 are shown to be unitary instruments. Alternatively, they may be two-part cooperating devices such as photoeyes with a source or transmitter located on one side of a conveyor 12 and a receiver and/or reflector disposed on an opposite side and aligned with the transmitter, so long as they provide high sensitivity and reliability. Other sensors usable consistent with teachings of this invention are infrared detectors, capacitive proximity switches, ultra sound detectors and microwave detectors, depending upon the type of article to be transferred.

As particularly shown in FIG. 3, a continuous stream of closely spaced products 21 is brought on the infeed lines 12 at a rate or velocity V(a) and into contact with the side transfer conveyors 18. The transport belts 31 of the side transfer conveyors 18 move the product stream at an increased rate V(b) for placement of a predetermined group size onto the outfeed line 13 which constantly travels at a matching rate V(b). The movement of the transport belts 31 of each particular side transfer conveyor 18(a-c) is coordinated with the movement of the adjacent side transfer conveyors 18(a-c) so that as one conveyor 18 is activated, the remaining conveyors 18 are inoperative. As previously discussed, the outfeed sensors 69 control the activation and deactivation of the belts 31 so that the product group 20 is stopped at a particular point to prevent any more than the predetermined group size from entering the outfeed conveyor 13, or the belts 31 may be synchronized with respect to time.

Ancillary packaging or other processing systems may be utilized in conjunction with the lane merger apparatus 10 of this invention. For example, a container wash system having nozzles may be disposed adjacent the side transfer conveyors 18. Leaky containers may expel fluid contents onto the side transfer conveyor 18 and adjoining containers 21 while being engaged and merged. The nozzles spray a fine mist of water or a suitable solvent on the containers 21 for sanitation purposes. The mist from nozzles keeps both the conveyors 18 and the containers 21 free from any such discharged container contents. The frame structure platform 17, side transfer conveyor 18 and drive mechanism 22 structures described herein, are all designed to operate under solvent mist conditions.

FIG. 8 shows apparatus 10 in use with an overall product processing or packaging operation 98. As shown, four 3-lane mergers 100 are each used to merge three infeed lines 99 into a single outfeed line 101, so that a single supply of products is being transported to downstream packaging or processing stations, such as a container leak detection system 102 and container labeling system 103, for example. Thereafter, a series of 2-lane mergers 104 are arranged to cooperatively yield a single outfeed line 105 of product for another processing station 106, for example, a sleeve apparatus.

As many changes are possible to the embodiments of this invention utilizing the teachings thereof, the descriptions above, and the accompanying drawings should be interpreted in the illustrative and not the limited sense.

That which is claimed is:

1. An article control apparatus for merging articles from a plurality of lines into a single line, comprising:
   (a) a frame structure having a substantially flat top surface;
   (b) at least two side transfer conveyors disposed on said frame structure top surface, said side transfer conveyors engaging and linearly translating a predetermined number of articles in close registration with one another at a first predetermined rate, said side transfer conveyors being synchronized so that as one is operative, the other is inoperative, each said side transfer conveyor comprising a pair of parallel, upstanding, and counter-revolving belts which are separated by a predetermined distance which is slightly less than the diameter of an article and which forms a central conveyance path, said belts having a flat surface on a side contacting the articles in said central conveyance path and further having a longitudinally disposed alignment rib centrally located on an opposite side,
   (c) a pair of input conveyors extending to inlet ends of said side transfer conveyors and inputting articles from the plurality of liens to said side transfer conveyors, said input conveyors inputting articles at a second predetermined rate which is lower than said first predetermined rate, and
   (d) an output conveyor extending from outlet ends of said side transfer conveyors and receiving articles from said side transfer conveyors, said output conveyor moving articles at said first predetermined rate, and further having means to direct the articles into a single line configuration, said input and output conveyors being arranged with respect to said frame structure so that a void area is formed under side transfer conveyors.

2. The article control apparatus of claim 1, comprising three synchronized and alternating side transfer conveyors.

3. The article control apparatus of claim 1, wherein said means to direct is a guide rail structure having a pair of inlet ends, each being disposed in alignment with one said side transfer conveyor, and a single outlet end.

4. The article control apparatus of claim 1, wherein said central conveyance paths of said side transfer conveyors are arranged side by side, in a spacially parallel configuration.

5. The article control apparatus of claim 1, wherein each said side transfer conveyor has backing structures which are constructed and arranged adjacent said belts to maintain contact between said belts and the articles in said central conveyance path, said backing structures having a vertical brace, top and bottom horizontal roller supports connected to end portions of said brace, a center guide connected to said brace at its midsection and having a notch for alignment with said alignment rib of said belt, a plurality of spatially parallel roller shafts vertically disposed between said roller supports and said center guide, and a plurality of rollers axially and rotatably linked to said roller shafts, said rollers further being arranged with respect to each other to provide a substantially flat low friction surface for supporting said belts.

6. The article control apparatus of claim 1, wherein said side transfer conveyors further comprise drive means which cycles through activation and deactivation states for each side transfer conveyor to synchronously alternate operation therebetween.

7. The article control apparatus of claim 6, wherein said drive means includes a power source, two DC drive motors connected to said power source, a clutch brake operative on each said motor, and pulley means linking each said pair of side transfer conveyor belts to one of said motors.

8. The article control apparatus of claim 6, wherein said drive means includes a power source, two Stepper motors connected to said power source and pulley means linking each said pair of side transfer conveyor belts to one of said motors.

9. The article control apparatus of claim 6, further including means to control said drive means, said control means including a control module communicatively connected to said drive means, and at least two outfeed sensors disposed adjacent said side transfer conveyor output ends, said sensors monitoring the number and position of articles output by each said side transfer conveyor, whereby said control module controls the activation and deactivation state cycling of said side transfer conveyors.

10. The article control apparatus of claim 9, wherein each said outfeed sensor comprises at least one photoeye disposed adjacent said output conveyor and directed toward the respective output end of said side transfer conveyor, and reflective means disposed adjacent said side transfer conveyor output end and aligned with said photoeye.

11. The article control apparatus of claim 9, wherein said control means further includes at least one upstream surge sensor disposed adjacent each said input conveyor, whereby said control means deactivates either said side transfer conveyor when the supply of articles on its corresponding, aligned input conveyor is interrupted.

12. An article merging apparatus, comprising:
 a) a frame structure having a substantially planar, stationary work surface,
 b) at least two infeed lines for supply of articles to said work surface at a first predetermined rate,
 c) at least two synchronized and alternating side transfer conveyors disposed on said frame structure work surface, one said conveyor being aligned with each said infeed line for engaging and positively advancing at a second predetermined rate which is greater than said first predetermined rate, in close registration to one another, a predetermined number of articles from said infeed lines, said side transfer conveyors each having a pair of parallel upstanding and counter revolving belts separated a predetermined distance slightly less than the diameter of an article and forming a linear, central conveyance path, said belts having a flat surface on a side contacting the articles in said central conveyance path and further having an alignment rib located on an opposite side,
 d) means to direct articles conveyed by said side transfer conveyors into a linear configuration,
 e) an outfeed line aligned with said means to direct said out feed line conveying articles at said second predetermined rate, said outfeed line being arranged with respect to said infeed lines so as to form a void area under said side transfer conveyors, and
 f) means to alternate operation of said side transfer conveyors, whereby one side transfer conveyor is operative and the other side transfer conveyor is inoperative.

13. A collating apparatus for merging articles on two separate infeed lines into a single outfeed line, comprising:
 a) a frame structure having a substantially planar stationary top work platform, and including an infeed end and an outfeed end,
 b) at least two infeed conveyors for transport of a supply of articles to said frame structure infeed and, at a first predetermined rate,
 c) at least one side transfer conveyors disposed on said frame structure work surface, each said side transfer conveyor being aligned with a respective infeed conveyor at said frame structure infeed end, said side transfer conveyors each having a pair of parallel upstanding belts separated a predetermined distance and forming a linear, central conveyance path, said side transfer conveyor gripping a plurality of articles, said side transfer conveyors being synchronized and alternately operable to positively advance a predetermined number of articles from respective said infeed conveyors to said frame structure outfeed end, at a second predetermined rate, said second predetermined rate being greater than said first predetermined rate, said side transfer conveyors each having a pair of parallel upstanding belts separated a predetermined distance and forming a linear, central conveyance path, said side transfer conveyors further having low friction backing plates including a plurality of rollers aligned longitudinally with respect to said belts and which are constructed and arranged adjacent said belts to urge said belts into gripping engagement with articles in said central conveyance path,
d) means to control the alternating operation of said side transfer conveyors, whereby as one side transfer conveyor is operative the other is inoperative, said control means including a motor mechanism connected to each side transfer conveyor, means to quickly activate and deactive said motor mechanisms, and sensor means disposed at said frame structure outfeed end, adjacent said side transfer conveyors,
e) a guide rail structure located at said frame structure outfeed end and aligned with said side transfer conveyors to direct articles conveyed thereby into a single line configuration, and
f) an outfeed conveyor aligned with said guide rail structure to receive articles output by said side transfer conveyors, said outfeed conveyor transporting articles at said second predetermined rate.

14. A method of merging articles on two infeed lines into a single outfeed line, comprising the steps of:
a) providing a continuous supply of articles at at least two input locations, via input conveyance means, at a first predetermined speed,
b) engaging, via a second side transfer conveyor, for a first period, a predetermined number of articles from a first said input location and linearly conveying the articles at a second predetermined speed to a common output location, said second predetermined speed being greater than said first predetermined speed,
c) conveying the articles from said output location, via output conveyance means at said second predetermined speed,
d) engaging, via a second side transfer conveyor, for a second period, a predetermined number of articles from a second said input location and linearly conveying the articles at a predetermined speed to said common output location, said first and second side transfer conveyors each comprising a pair of parallel, upstanding, and counter-revolving belts which are separated by a predetermined distance which is slightly less than the diameter of an article and which forms a central conveyance path over a void area, said belts having a flat surface on a side contacting the articles in said central conveyance path and an alignment rib located on an opposite side,
e) said first and second periods being distinct and mutually exclusive of each other,
f) conveying the articles from said output location via said output conveyance means, at said second predetermined speed, and
g) repeated steps b) through f).

* * * * *